April 19, 1955 — R. R. NIGH ET AL — 2,706,357
DUCK DECOY
Filed July 7, 1953
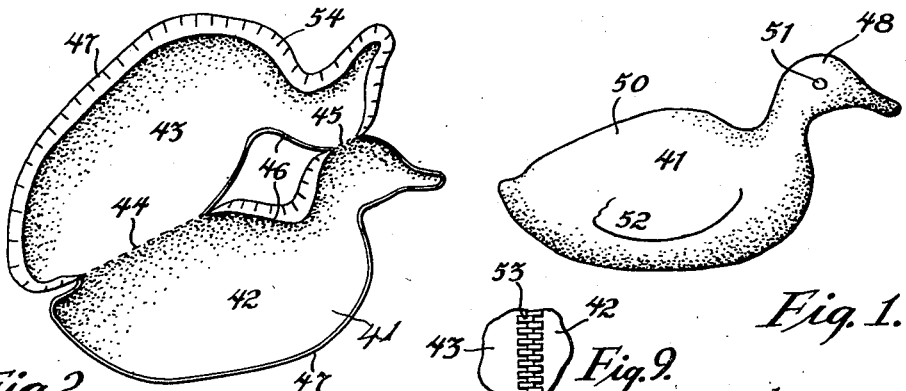
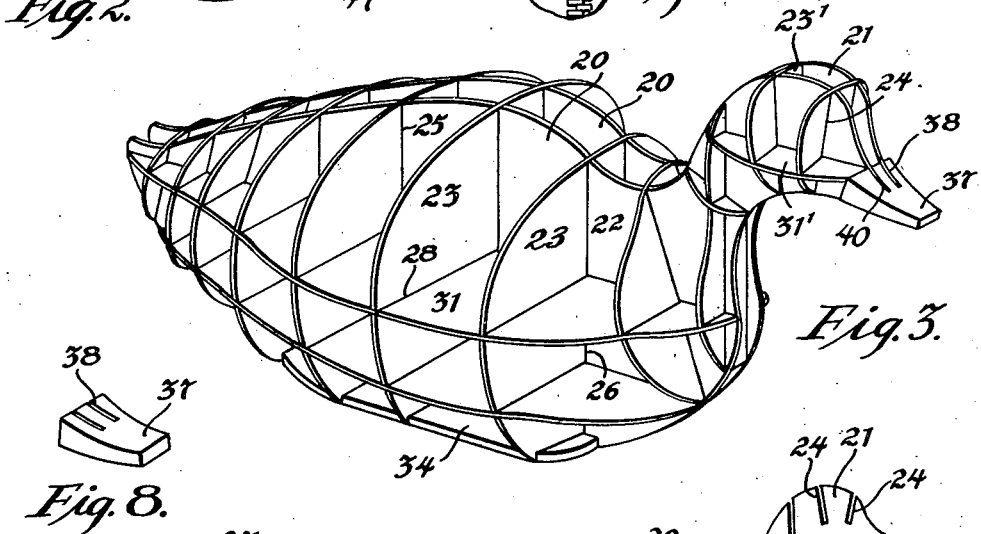
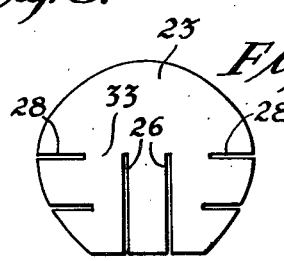
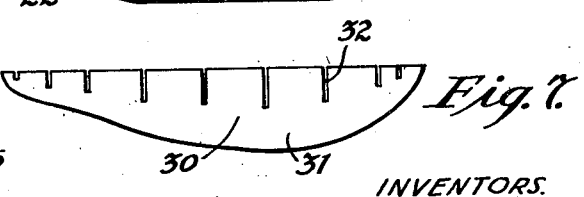
INVENTORS.
ROBERT R. NIGH
JOHN W. RANDOLPH
BY
ATTORNEYS.

United States Patent Office 2,706,357
Patented Apr. 19, 1955

2,706,357

DUCK DECOY

Robert R. Nigh and John W. Randolph, Enid, Okla.

Application July 7, 1953, Serial No. 366,470

3 Claims. (Cl. 43—3)

The present invention relates to figures of animals which are believed to have their primary utility in decoys, but are also applicable to advertising displays, Christmas decorations, theatrical props and museum habitat groups.

For convenience in referring to the subject matter throughout the specification it is generally described as a duck decoy, but it will be understood that this is intended to include representations of animals for any suitable purpose, and is not intended to be limited to ducks, since it is equally applicable to decoys and other representations of geese, crows, and the like.

A purpose of the invention is to produce a more life-like duck decoy.

A further purpose is to make a duck decoy which is lighter, less expensive and more convenient.

A further purpose is to make a duck decoy which can be sold in knock-down form and thus will occupy a smaller space prior to assembly, and which can be disassembled for storage if desired.

A further purpose is to produce a duck decoy from a frame consisting of moisture resistant cardboard or the like.

Further purposes appear in the specification and in the claims.

In the drawings we have chosen to illustrate one only of the numerous embodiments in which our invention may appear, selecting the form shown from the standpoints of convenience in illustration, satisfactory operation, and clear demonstration of the principles involved.

Figure 1 is a perspective of a duck decoy in completely assembled form and embodying the principles of the invention.

Figure 2 is a side elevation showing the cover prior to assembly.

Figure 3 is a perspective of the frame.

Figure 4 is a perspective of the base.

Figure 5 is a side elevation of one of the longitudinal vertical ribs.

Figure 6 is a front elevation of one of the transverse ribs.

Figure 7 is a top plan of one of the longitudinal lateral ribs.

Figure 8 is a perspective of the bill.

Figure 9 is a fragmentary elevation showing the cover closed by a water-tight slide fastener.

Describing in illustration but not in limitation and referring to the drawing:

Duck decoys have frequently been made which are relatively poor imitations of a duck, and which on close inspection by an arriving flock are easily seen to be spurious.

Efforts have been made to produce more life-like duck decoys, but they have generally resulted in adoption of expensive methods of production, such as plastic molding and the like.

By the present invention a very inexpensive duck decoy is obtained which nevertheless is quite life-like in appearance. The duck decoy of the present invention also has the advantage of being very compact for purposes of shipment and storage, since it is made by assembling a frame and then applying a flexible cover to the outside of the frame.

In accordance with the invention a frame is made of ribs which are desirably interlocked for rigidity, and then are covered by a flexible and removable cover. Since both the frame and the preformed cover are of duck shape and appearance, a very life-like decoy is obtained.

Considering now the drawings in detail, a pair of spaced longitudinal ribs 20 have the silhouette of a duck are provided. Thus they provide a head 21 and a body 22. Slots cut part way across the top section at intervals provide for insertion of transverse ribs 23 of various shapes and sizes. Thus there are slots 24 in the head and slots 25 in the body which desirably are cut substantially half way across from top to bottom. The transverse ribs 23 in the body have slots 26 coming up from the bottom in spaced relation substantially half way for receiving the imperforate portion 27 of the longitudinal vertical ribs 20 when the transverse ribs and longitudinal vertical ribs are interlocked as shown. Similarly in the head there are transverse ribs 23' which are similarly slotted to those in the body and similarly interlocked with the longitudinal vertical ribs. The transverse ribs at their sides, extending part way in, have horizontal slots 28 which receive the imperforate portion 30 of longitudinal lateral ribs 31 which are slotted at 32 from the inner edge approximately half way across to pass the imperforate portions 33 of the lateral ribs. There is a similar longitudinal lateral rib 31' which engages at each side of the head, interlocking with the transverse ribs in the manner just described for the body, and having similar slots.

The ribs just described which make up the bulk of the frame are preferably of cardboard and desirably of the character of wax or paraffin-impregnated cardboard commonly used for milk or other liquid containers and therefore quite moisture resistant.

A base 34 preferably of wood, suitably thick and heavy enough to keep the center of gravity of the decoy low, is provided with longitudinal slots 35 part way through from the top and transverse slots 36 part way through from the top which receive the lower portions of the longitudinal vertical ribs and the transverse ribs of the body.

A bill piece 37 of wood or the like has a comparatively wide duck-like bill shape, and is vertically slotted at 38 in spaced relation to receive forward end portions 40 of the longitudinal vertical ribs.

In ordinary practice the frictional engagement by tight fits at the slots is sufficient to hold the various parts of the frame together, and it is ordinarily not necessary to use adhesive, but it will be understood that the user if desired can supplement the frictional holding power by applying adhesive at the meeting points of the ribs with respect to one another and with respect to the base and the bill piece.

A preformed skin or cover 41 is provided consisting of two halves 42 and 43 joined at fold line 44 and 45 near the top and having edges 46 and 47 which require sealing when the two halves are brought together. The cover has the contour of the head at 48 and of the body at 50, with other features such as the eye 51 and the wing 52 applied by ornamentation methods such as painting. The cover may be made of any suitable flexible material, although cheesecloth cut and seamed to fit the bulged contour of the frame has been found to be satisfactory. The cover is coated with a waterproof or water resisting material, such as a plastic used in making coated fabrics or raincoats, suitable examples being polyvinyl chloride and rubber. When the cover is applied to the frame and the seal lines 46 and 47 are brought together for sealing, sealing is accomplished in one of several ways. Waterproof slide fasteners 53 are conveniently used. The joints may also be sealed by adhesive tape, leak-sealing compound or waterproof adhesive as desired. It will be understood that slight leakage is not objectionable, as long as it does not cause the decoy to fill with water in the course of a few hours.

It will be understood that there is desirably an overlapping flap 54 at the edges to be joined, which by overlapping reduces the likelihood of leakage. One advantage of the invention is that several alternate covers may be employed on the same frame representing male, female, mallard, canvas-back, etc. varieties of ducks.

While the form illustrated is intended primarily to be made from cardboard, with small amounts of wood, and with a fabric cover, it will be understood that other suitable materials such as paper, plastic and light metals may be employed for the frame, where desired.

The device of the invention when assembled is attractive. It is very easy for the user, supplied with the parts in knockdown form, to assemble the interlocking ribs, the bill piece and the cover.

Experiments on the device indicate that it is surprisingly sturdy and durable. It has withstood kicking like a football, and has also under test been piled under assorted objects without crushing or bruising.

While a preformed shaped cover is preferred, it will be understood that the cover may be of elastic or form fitting material where desired.

In view of our invention and disclosure variations and modifications to meet individual whim or particular need will doubtless become evident to others skilled in the art, to obtain all or part of the benefits of our invention without copying the structure shown, and we therefore claim all such insofar as they fall within the reasonable spirit and scope of our claims.

Having thus described our invention, what we claim as new and desire to secure by Letters Patent is:

1. A simulation of an animal comprising relatively spaced longitudinal vertical ribs transversely slotted partially across the ribs at intervals in alignment thereon, a plurality of spaced transverse ribs vertically slotted to pass the longitudinal ribs and engaging in the slots of the longitudinal vertical ribs and having at the sides slots to receive longitudinal lateral ribs, spaced longitudinal lateral ribs at the sides slotted to pass the transverse ribs and engaging in the slots at the sides of the transverse ribs, the respective ribs together forming a frame having the contour of an animal, and a cover of animal-like appearance extending around the frame and adapted to be closed to seal against entry of moisture.

2. A simulation of an animal comprising relatively spaced longitudinal vertical ribs transversely slotted partially across the ribs at intervals in alignment thereon, a plurality of spaced transverse ribs vertically slotted to pass the longitudinal ribs and engaging in the slots of the longitudinal vertical ribs and having at the sides slots to receive longitudinal lateral ribs, spaced longitudinal lateral ribs at the sides slotted to pass the transverse ribs and engaging in the slots at the sides of the transverse ribs, the respective ribs together forming a frame having the contour of an animal, a base having longitudinal and transverse slots which receive the bottoms of the longitudinal vertical ribs and of the transverse ribs, and a cover of animal-like appearance extending over the outside of the ribs and the base and adapted to be sealed against entry of water.

3. A simulation of an animal according to claim 2 in which the cover is removable.

References Cited in the file of this patent

UNITED STATES PATENTS

| | | |
|---|---|---|
| 735,314 | Syms | Aug. 4, 1903 |
| 812,499 | Johnston | Feb. 13, 1906 |
| 833,966 | Johnston | Oct. 23, 1906 |
| 1,473,612 | Dewey | Nov. 13, 1923 |